(12) United States Patent
Pierce

(10) Patent No.: US 7,612,801 B2
(45) Date of Patent: Nov. 3, 2009

(54) CALIBRATION METHODS AND APPARATUS FOR DIGITAL CAMERAS

(76) Inventor: Edward Alan Pierce, 7526 Promontory Ct., Wilmington, NC (US) 28412

( * ) Notice: Subject to any disclaimer, the term of this patent is extended or adjusted under 35 U.S.C. 154(b) by 273 days.

(21) Appl. No.: 11/782,330

(22) Filed: Jul. 24, 2007

(65) Prior Publication Data

US 2008/0094474 A1   Apr. 24, 2008

Related U.S. Application Data

(63) Continuation-in-part of application No. 10/636,738, filed on Aug. 8, 2003, now Pat. No. 7,248,284.

(60) Provisional application No. 60/402,603, filed on Aug. 12, 2002.

(51) Int. Cl.
*H04N 17/00* (2006.01)
*H04N 17/02* (2006.01)

(52) U.S. Cl. .................. 348/188; 348/187; 348/175; 348/363

(58) Field of Classification Search ......... 348/187–188, 348/175–176, 208.12, 222.1, 223.1, 221.1, 348/362–363, E17
See application file for complete search history.

(56) References Cited

U.S. PATENT DOCUMENTS

| | | | |
|---|---|---|---|
| 3,952,144 A | 4/1976 | Kolker | |
| 4,236,795 A | 12/1980 | Kephart | |
| 4,671,661 A | 6/1987 | Ott | |
| 4,706,131 A | 11/1987 | Perten et al. | |
| 4,771,305 A | 9/1988 | Potoroka | |
| 5,118,183 A | 6/1992 | Cargill et al. | |
| 5,475,460 A | 12/1995 | Stephenson et al. | |
| 5,621,217 A | 4/1997 | Seachman et al. | |
| 5,699,440 A | 12/1997 | Carmeli | |
| 5,809,366 A | 9/1998 | Yamakawa et al. | |
| 5,821,993 A | 10/1998 | Robinson | |
| 5,828,793 A | 10/1998 | Mann | |
| 6,366,680 B1 | 4/2002 | Brunk et al. | |
| 6,437,823 B1 | 8/2002 | Zhang | |

(Continued)

FOREIGN PATENT DOCUMENTS

WO   WO 01/89205 A1   11/2001

OTHER PUBLICATIONS

JP10063047A2: Image Forming Device And Controller And Control Method Therefor, (Mar. 6, 1998).

(Continued)

*Primary Examiner*—Trang U Tran
(74) *Attorney, Agent, or Firm*—Millen, White, Zelano & Branigan, P.C.

(57) ABSTRACT

Digital cameras are calibrated so that detailed highlights and shadows in scenes being photographed are reproduced in digital images of those scenes by calibrating holographic data obtained from target images at those scenes. In one embodiment the target image is obtained from an actual target having black and white, and optionally gray, target areas; and in another embodiment, the target image is obtained from the scene being photographed. In both embodiments, histographic data is manipulated so that shadow and highlight data spikes are automatically placed in boundary areas by automatically adjusting lens aperture and/or shutter speed prior to taking the desired photograph of the scene. The resulting photograph is adjusted for highlight and shadow details.

8 Claims, 13 Drawing Sheets

U.S. PATENT DOCUMENTS

| | | | |
|---|---|---|---|
| 6,560,410 | B2 | 5/2003 | Ichikawa et al. |
| 6,768,509 | B1 | 7/2004 | Bradski et al. |
| 6,798,446 | B2 * | 9/2004 | Maggi .................. 348/207.99 |
| 7,376,345 | B2 * | 5/2008 | Corley ........................... 396/5 |
| 7,429,999 | B2 * | 9/2008 | Poulin et al. ................ 348/187 |
| 2001/0045980 | A1 | 11/2001 | Leonard |

OTHER PUBLICATIONS

JP3298025B2: (Jul. 2, 2002).
JP11088855: Image Processing Unit, (Oct. 13, 2000).
JP05020271, Yamakawa et al. (Sep. 15, 1998).
Monitor Calibration Screen-PWC Photo, http://www.pwc.photo.com/Calibration, pp. 1-4.
FORS1 Integration, http://216.239.41.100/search?q-cache:1MYQ1FePTrYC: www.eso.org/instruments/fors, pp. 1 and 2.
Starship Modeler, Photography for Modelers, http://216.239.41.100//search?q=cache:sf XRGGe5OUC:www.starshipmodeler.com.tec.
Gamma & Density Co., http//216.239.41 . 100/search?q-cache:nPEaRkBv3zsC:www.gammaanddensity.com/sy, pp. 4-6.
Article: Through The Eyes Of A Professional Observer (Lick Vulcan Camera Project) Peggy Bernard.
Notices: Means, pp. 1-7.
Notices: Claims, pp. 1 and 2.
Notices: Detailed Description, pp. 1-8.
Notices: Technical Field, p. 1.
Notices: Description of Drawings, pp. 1 and 2.
Notices: Drawings, pp. 1-4.
How Digital Cameras Work: http://electronics.howstuffworks.com/digital-camera.htm/printable, pp. 1-18.
ISO vs EI Speed Ratings for Kodak Films.

* cited by examiner

Uncorrected Image

Corrected Image

CALIBRATION METHODS AND APPARATUS FOR DIGITAL CAMERAS

RELATED APPLICATIONS

This application is a continuation-in-part of U.S. patent application Ser. No. 10/636,738, filed Aug. 8, 2003 now U.S. Pat. No. 7,248,284 which claims the benefit of U.S. Provisional Application Ser. No. 60/402,603 filed Aug. 12, 2002 and incorporated herein in its entirety by reference.

FIELD OF THE INVENTION

The present invention is directed to calibration methods and apparatus for digital cameras. More particularly, the present invention is directed to calibration methods and apparatus for selecting exposure settings and achieving white balance in digital cameras.

BACKGROUND OF THE INVENTION

In contrast with the digital photography, film photography traditionally has an exposure tolerance of two to four stops. An original scene exposed within this tolerance range will retain a good quality tonal curve due to the film, which is the recording medium, having a light sensitivity range which exceeds the tonal extremes in an average scene of two to four stops. Exposure for digital photography has a very narrow range, so that when there is over exposure or under exposure, part of the information is lost. Consequently, unless you initially achieve the desired exposure you make an inferior image file, which will not be in full detail either in highlight areas or shadow areas. There is no way to retrieve these lost details for the image file. Consequently, in digital photography techniques have evolved to fix images after they have been taken. This is a time consuming and relatively expensive undertaking in which it is still very difficult to compensate for information missing from an image.

Inside digital cameras there is a sensor on which a latent light impression of an original scene is made. Based on latent information from the sensor, a central processing unit in the camera processes the information into a proper color spectrum and into a proper color curve that retains the detail from highlight to shadow. The quality of image produced using the latent light impression frequently has diminished quality due to exposure error.

All sensors inside cameras have an optimal sensitivity setting (ISO), whether it is due to the sensitivity of film or to the sensitivity of image sensors in digital cameras. Sensitivity has an optimal range where it produces the absolute best image file in terms of color fidelity with the least image defects. In producing an optimal image file, the image file will be given a rated ISO, e.g., 100. Digital cameras have the capability of shooting other ISOs, but as one deviates from the optimum image quality suffers. When deviating from the optimal ISO, noise is introduced into the image files from the CPU and arbitrary abnormalities known as artifacts become visually apparent and the quality and color degrade. Thus, producing optimal digital image files is difficult for the professional photographer and extremely difficult for the consuming public.

Hand held light meters do not adequately compensate for inaccuracies in exposure because tolerances are typically plus or minus a half stop of exposure. Typically light meters select a middle tone, the placement of which varies from one manufacturer to another. Since light meters peg the middle of the tonal curve, light meters select gray rather than the black and white extremes. Pegging the middle of the tonal curve can result in the photographer loosing information at one or the other extreme so that light metering does not work effectively. This forces camera manufactures to develop methods to fix latent information. In order to compensate for inadequate latent information, camera manufacturers provide you with software solutions for manipulating improperly exposed and color-balanced images. But, these "back end fixes" almost invariably produce inferior image files with which before you can even start to produce a print, require very labor intensive efforts having three times the amount of work to process an image file. Accordingly, there is a need for a technique to correctly set exposure and color balance on the front end, i.e. prior to recording an image.

Obtaining correct exposure is part of the problem, the other part being correcting white balance. Most digital cameras provide different options for white balance correction which may be automatic or set by the photographer. Such settings are ballpark settings based on daylight, flash, overcast sky, tungsten filament lighting or fluorescent lighting. Daylight varies depending on the time of day with the color temperature being different at morning, midday and afternoon. There are also differences in white balance due to brightness of tungsten light bulbs because brightness determines color temperature. Since current white balance settings for digital cameras are quite inaccurate, there is a need for improvement.

In view of the aforementioned considerations, in digital photography there is need for improvement in the ability to select correct or desired exposure settings, as well as a need for improving the ability to correct or select desired white balance settings.

SUMMARY OF THE INVENTION

The present invention is related to calibration methods and apparatus for digital cameras performed prior to exposing an image of an original scene to an image sensor within the camera by exposing the image sensor to calibration information provided at or by the original scene.

In one embodiment of the calibration, use of a digital calibration target involves adjusting the exposure of digital cameras to retain maximum detail by referencing the brightest important highlight detail (white area of the target) and the darkest important shadow detail (black area of the target) instead of the traditional metering method which references 18% gray. Additionally by ensuring the digital calibration target panels are absolutely neutral (without color bias), the target allows the adjustment of the camera's white point to be set accurately in virtually all lighting situations.

In another embodiment of the calibration, the target is referenced at the location of an original scene and the camera automatically adjusts the exposure and white balance based on the information recorded on the camera's sensor without the photographer's intervention.

In still another embodiment of the calibration, the incorporated information provided by the target is in the scene itself, which information provides important highlight and shadow detail and adjusts automatically so that the need to record an external target is eliminated.

In another embodiment of the invention a calibration target having a substantially white target area that reflects substantially all wavelengths of visible light and a substantially black target area that absorbs substantially all wavelengths of visible light when focused upon, achieves an exposure setting for the digital camera. The exposure setting is then adjusted for the target by a controller in the camera until an adjusted exposure setting for black and white detection is substantially balanced within the camera for a selected intensity and distribution of light at the original scene. The adjusted exposure setting is then applied to at least one image photographed at the scene.

In a further aspect of the invention, at least one substantially gray target area is provided and exposed simultaneously with exposure to the black and white target areas.

In still a further aspect of the invention, the adjusted exposure setting for an exposure balanced image is exposed to a substantially neutral, white or gray target area without color bias that reflects equally substantially all wavelengths of light to produce settings for a color balanced, calibrated image having a selected white balance for the original scene.

In still another aspect of the invention, adjusting the exposure is performed by viewing a histogram display within the digital camera and automatically adjusting the exposure settings until spikes representing black and white detection are not offset laterally with respect to a histogram function.

In still another aspect of the invention, an initial exposure setting is obtained of the location prior to exposing the image sensor to the calibration target. The initial exposure setting is then automatically adjusted without the photographic intervention by subsequent exposures to the calibration target to achieve correct or desired exposure settings.

In a further aspect of the invention, the target further includes at least one middle gray target area, which reflects substantially all wavelengths of light without color bias.

In still a further aspect of the invention, the target includes a neutral white or gray target area without color bias, which neutral area when positioned at locations of scenes prior to recording images of the scenes, determines settings for desired color balances for the images.

In a further aspect of the invention, the target configuration is a panel having black and white target areas on a first side and the neutral target area on a second side of the panel.

The invention further relates to methods of digital photography utilizing the aforedescribed calibration methods and calibration targets.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
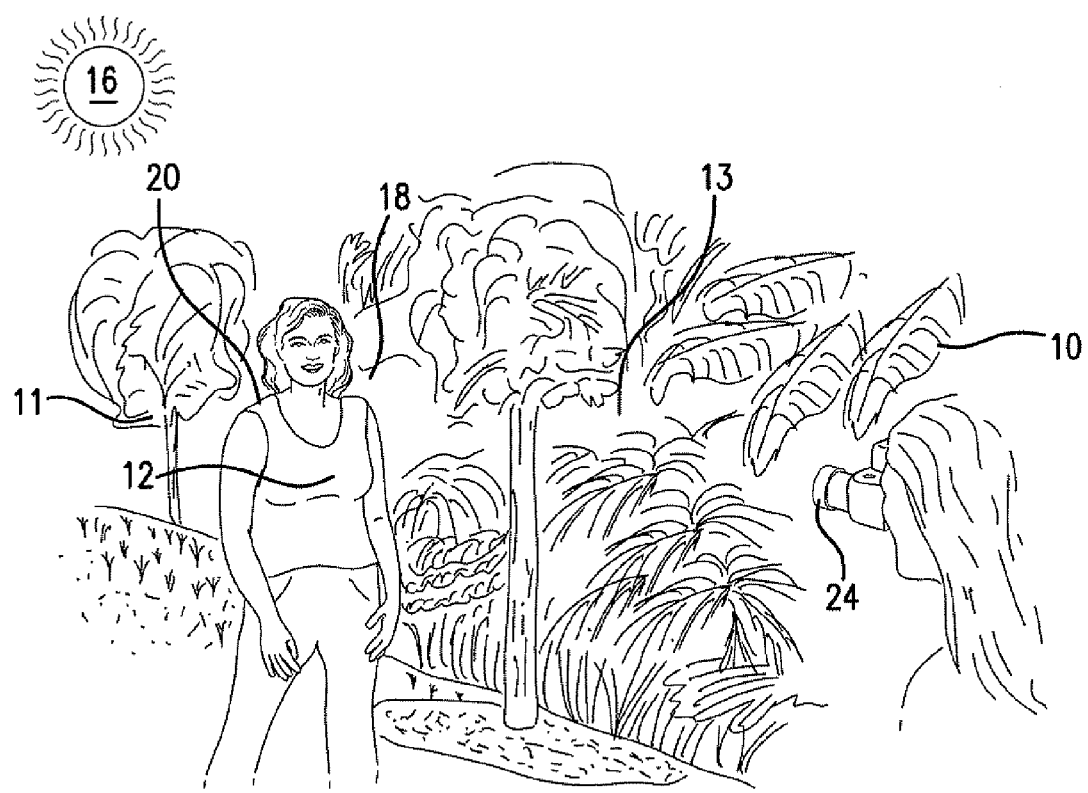
FIG. 1 is a perspective view of a scene being photographed.

Referring now to FIG. 1 there is shown a location 10 at which an original scene 11 is disposed, which scene may include a subject 12 to be photographed and a background 13. The location 10 may be any location and the scene 11 may be any scene with any particular object 12, or no particular object. The background 13 may be any background. The scene 11 is illuminated by a light source 16, which may be any light source, for example, a lamp, the sun, a photoflash or indirect light, which illuminates the location 10 of the scene 11.

The scene 11 has shadows 18 and highlights 20. The shadows 18 and highlights 20 may be definite and readily apparent, or may be subtle. For any subject 12, the shadows and highlight are usually intermingled, varied and complex.

The subject 12 and background 11 also has colors and tones, which may vary widely and interact with highlights and shadows to produce a visual image of the original scene 11. A digital camera 24 having a lens focuses the scene 11 on image sensors in the camera that record light electronically. Typically, in digital cameras the image sensors are charged coupled devices (CCD) or complimentary metal oxide semiconductor (CMOS) devices. A computer device in the form of a central processing unit (CPU) converts electrical charges from the image sensors into digital data, which is then stored as digitalized image information in the camera's memory.

Figure 2:
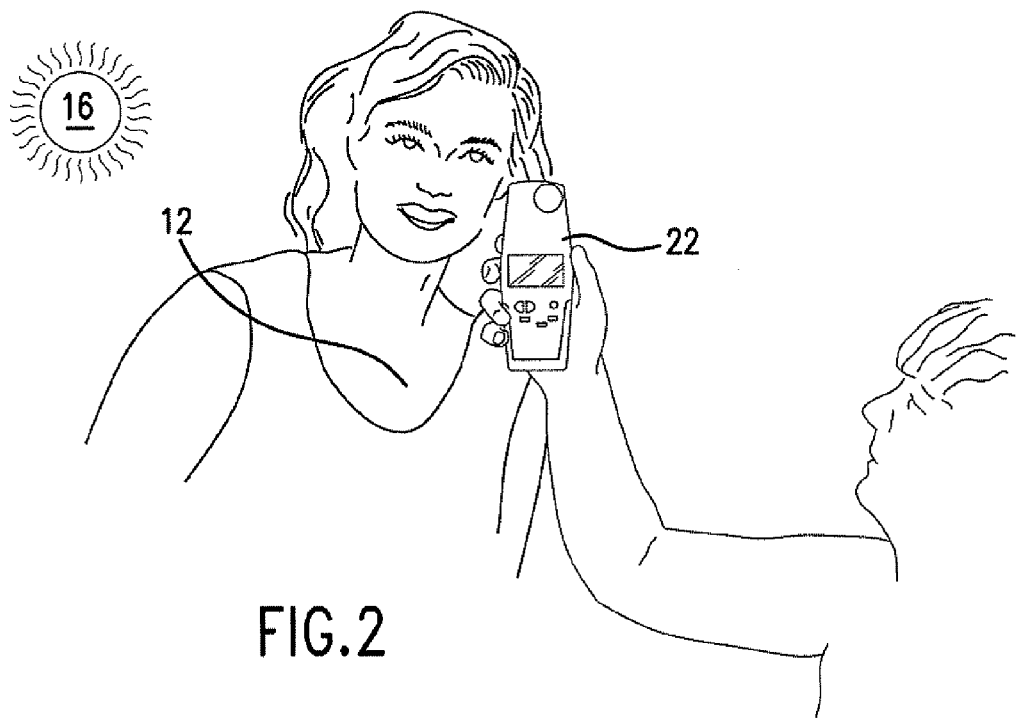
FIG. 2 is a perspective view of a portion of the scene of FIG. 1 showing a light meter being employed to select exposure settings.

As is seen in FIG. 2, a light meter 22 takes a reading proximate the subject 12 to determine initial exposure settings for the camera 24.

Figure 3:
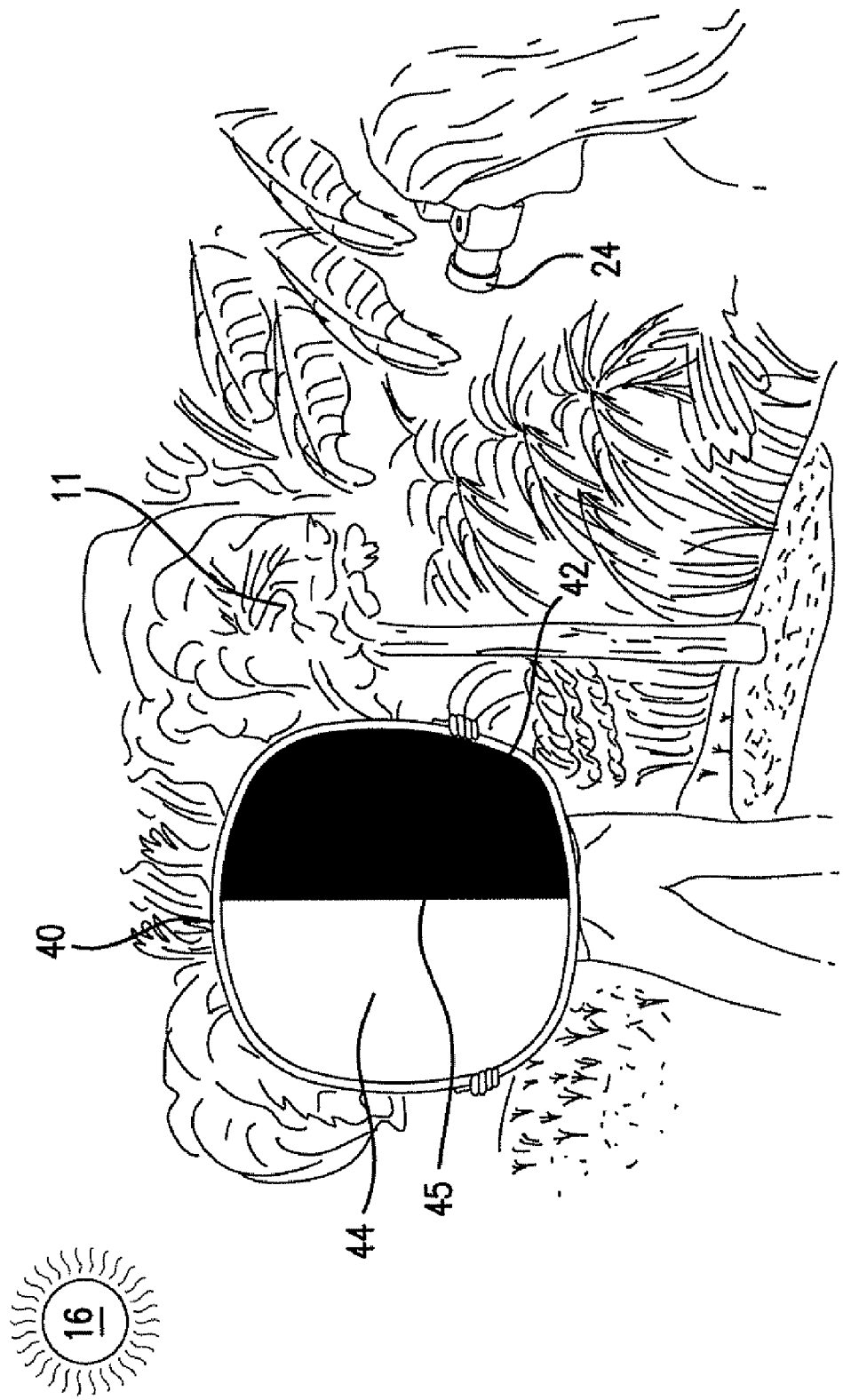
FIG. 3 is a perspective view showing a first embodiment of a calibration target configured in accordance with the present invention.
Figure 4:
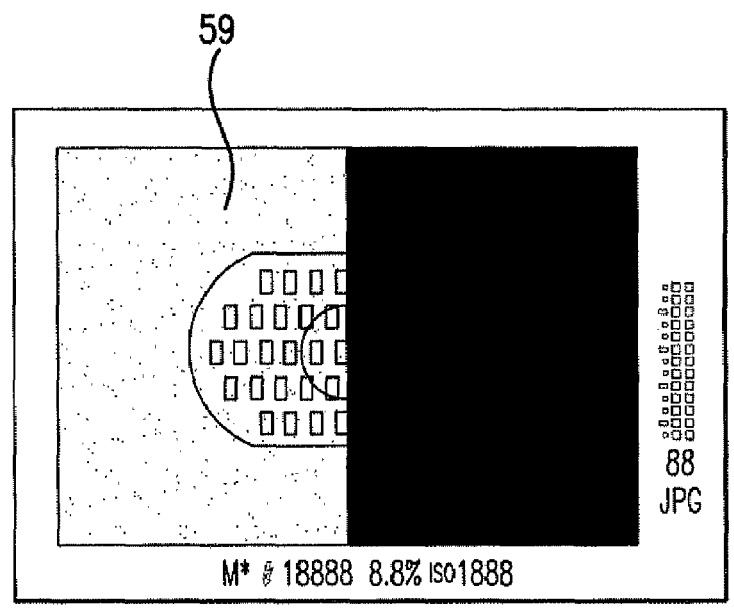
FIG. 4 is an uncorrected image of the calibration target of FIG. 3 in a viewfinder of the camera.

As is seen in FIG. 3, a calibration target 40, configured in accordance with the principles of the present invention, is inserted into the scene 11 at the approximate location of the subject 12 (if there is a subject). The calibration target 40 has a black target area 42 which absorbs substantially all wavelengths of visible light incident thereon from the light source 16 and a white target area 44, which reflects substantially all wave lengths of visible light incident thereon from the light source 16. The black and white target areas 42 and 44 cover substantially equal portions of the target 40. In the illustrated example, the target areas 42 and 44 are approximately rectangular with curved sides and separate from one another at line 45, however it is only necessary that the black and white target areas have the same amount of area. Accordingly, the black and white areas may have a checkerboard configuration or may be in the form of writing or a logo. For example, the white area 44 may form a background for the black area 42, which is in the form of writing with perhaps a logo or other design also in black. It is emphasized that the black and white target areas 42 and 44 need only be equal in area, but may have any desired configuration. While the black and white target areas 42 and 44 are illustrated as being on a panel, these areas may be on separate cards which are juxtaposed with one another, may be on adjacent sides of a carton, on a poster, on a screen or on a folded insert packaged with a digital camera.

The black and white target areas 42 an 44 are neutral in that they contain no color cast, the black target area 42 being substantially pure black and the white target area 44 being substantially pure white. The target 40 is not limited to specific size constraints or materials provided that it's reflective qualities are pure black and pure white.

Referring now to FIGS. 4-7 in conjunction with FIG. 3, the method of the present invention is practiced by focusing the camera 24 on the calibration target 40 and setting the camera to a "image and histogram" or "histogram only" display 50 (see FIGS. 5 and 7) on the LCD display panel of the camera 24. Care is taken to ensure the light falling on the calibration target 40 is of the same intensity as the light, which will be illuminating the subject 12 (FIG. 1). In otherwords, if the source 16 of light is the sun providing full illumination, then the illumination falling on the target should be full sunlight and not sunlight obscured by clouds or haze. If the light falling on subject 12 is from a cloudy sky, then the light on the calibration target 40 should be from the same cloudy sky. If the light source is a tungsten lamp, then the same lamp at the same position is used for the calibration target 40 as for the subject 12.

Figure 5:
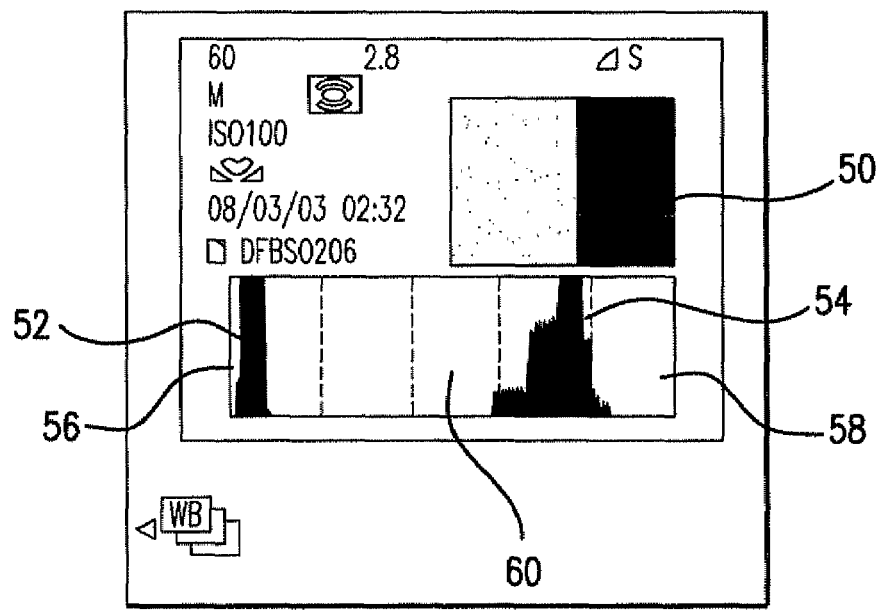
FIG. 5 is a histogram display of the uncorrected image of FIG. 4.
Figure 6:
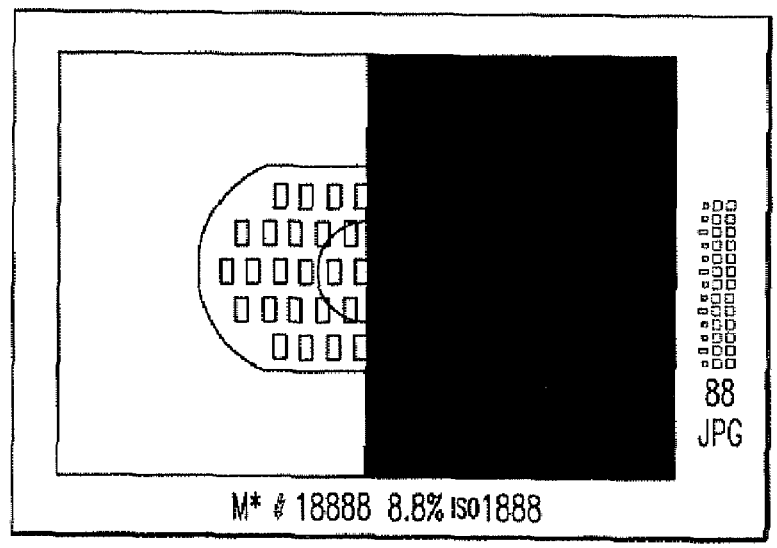
FIG. 6 is a corrected image of the calibration target of FIG. 3 in the viewfinder of the camera.
Figure 7:
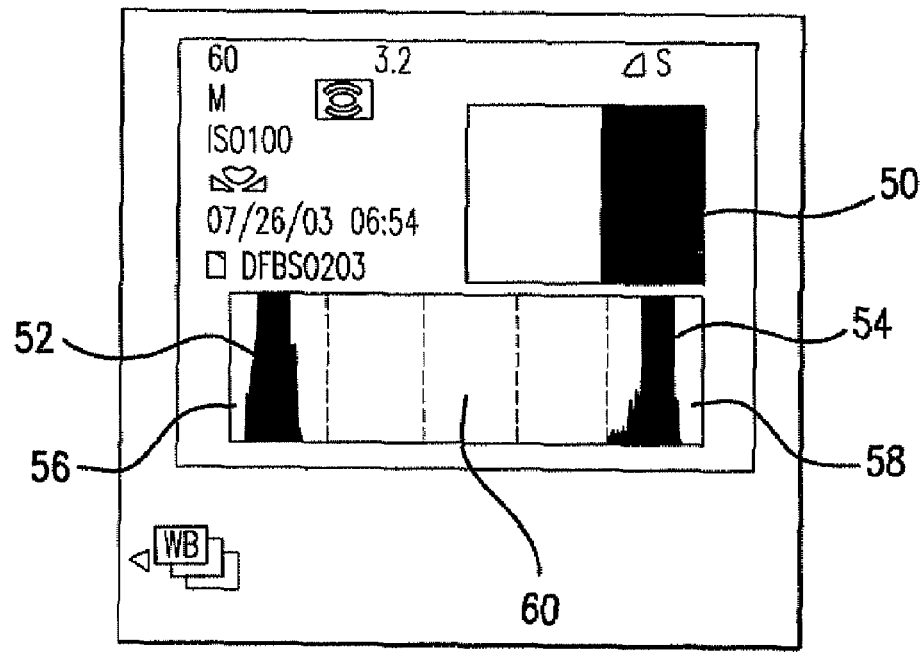
FIG. 7 is a histogram display of the corrected image of FIG. 6.

Preferably in practicing the method of the invention, an initial exposure is made using the camera's internal light meter or a handheld light meter 22 to provide initial exposure settings (see FIG. 2). As is seen in FIG. 5 this results in a histogram display 50 with two distinctive spikes 52 and 54 representing an initial exposure settings. The spike 52 represents black and the outside spike 54 represents white. Typically, the first exposure using the cameras internal light meter or an external light meter 22 will result in a histogram similar to FIG. 5 in which the black and white spikes 52 and 54 are shifted with respect to a left side boundary line 56 or a right side boundary line 58. The exposure settings of the camera 24 are then adjusted to move the spikes 52 and 54 to be equally contained in the area 60; equally balanced between the boundaries 56 and 58, and not offset to either the right or left side.

A second exposure (FIG. 3) is made to see if the spikes 52 and 54 remain in the area 60 and equally balanced between the left and right boundaries 56 and 58, respectively and not offset to either the right or left side. If the spikes 52 and 54 both remain in the area 60 and are equally balanced between the boundaries 56 and 58 with no lateral offset, the exposure settings are correct and the digital camera 24 is properly calibrated to photograph the subject 12, once the subject is returned to the scene 11 (if there is a subject 12) (see FIG. 1). If the black and white spikes 52 and 54 are still not both in the area 60 and equally balanced between boundaries 56 and 58 with no lateral offset, then the exposure settings of the camera are again adjusted and another exposure made to see if the spikes 52 and 54 are equally balanced within the left and right boundaries 56 and 58. The process of adjusting settings and then exposing image sensors in the camera to the calibration target 40, with the adjusted settings, and then viewing the additionally adjusted histogram display is continued until the spikes 52 and 54 are in the area 60 and equally balanced between the left and right boundaries 56 and 58 with no lateral offset. This may take a single adjustment or several adjustments to achieve. In any event, the subject 12 may now be digitally photographed with exposure settings properly set so that highlights and shadows of the photographed image of the original scene 11 will correspond to the original scene.

While a histogram display 50 is used in accordance with one embodiment of the invention, the characteristics of the histogram display are sensed electronically in another embodiment of the invention (not illustrated) and centered automatically by the CPU of the camera 24. In this alternative embodiment values assigned to the locations of black and white spikes 52 and 54 are compared to values assigned to the boundaries 56 and 58. After exposing the image sensors in the camera 24 initially to the camera's internal light meter or a hand held light meter 22 to obtain values for initial exposure settings corresponding to the positions of values for spikes 52 and 54, the camera is focused on the calibration target 40 and another exposure made. The value for the settings for this exposure are then compared to the values for the boundaries 56 and 58. If the calibration target values fall between the values for the boundaries 56 and 58, the exposure settings are calibrated. If not, an additional exposure is made or several additional exposures are made, until the values for the black and white spikes 52 and 54 do fall between the values for the boundaries 56 and 58.

The additional exposures may be done manually or automatically using a sequence of exposures with the histogram display simply informing the photographer visually or audibly that the exposure settings are correct.

While an initial exposure based on light meter readings would appear desirable, when using an automatic sequence of exposures this step could be either dispensed with or incorporated into the sequence, relying preferably on the camera's internal light meter.

Figure 10:
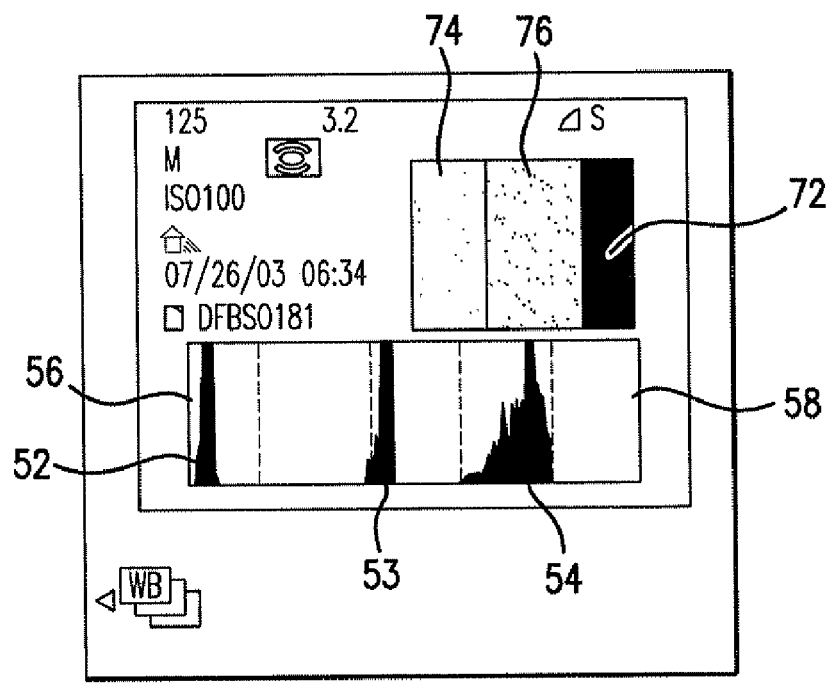
FIG. 10 is a histogram display of the uncorrected image of FIG. 9.
Figure 11:
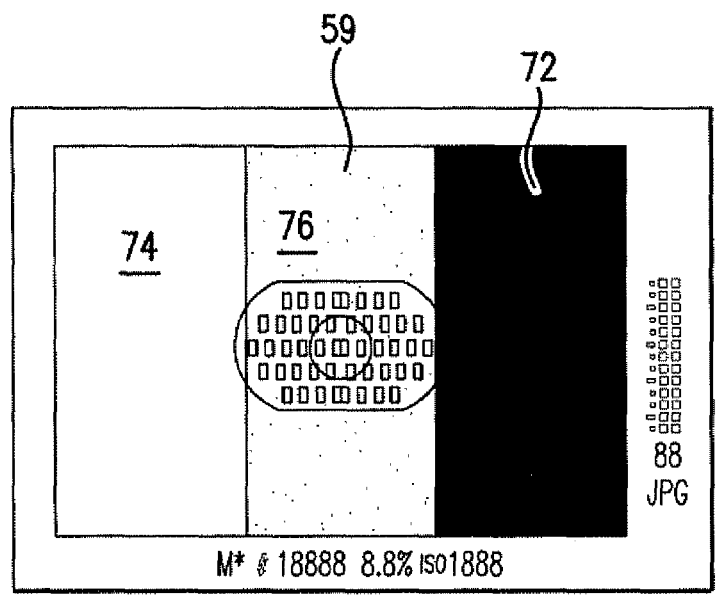
FIG. 11 is a corrected image of the second embodiment of the calibration target in the viewfinder of the camera.
Figure 12:
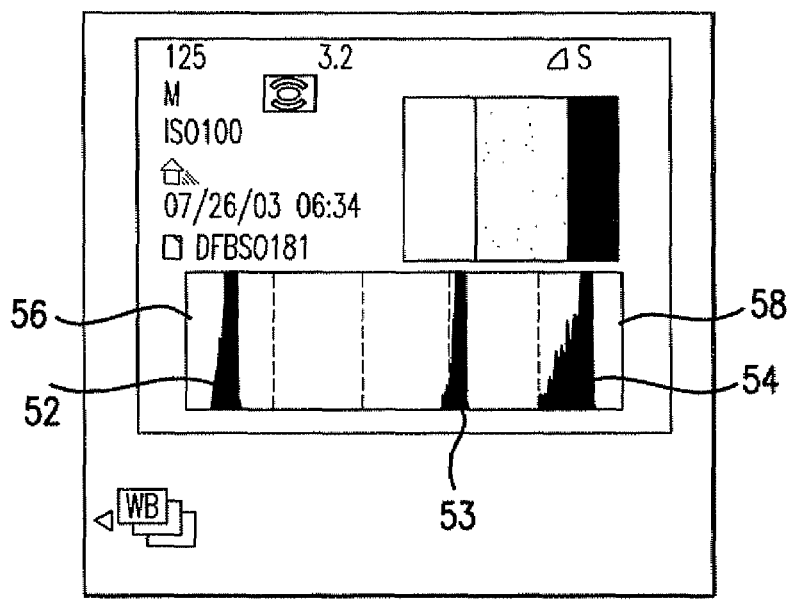
FIG. 12 is a corrected histogram display for the corrected image of FIG. 11.

Referring now to FIG. 8-12, a second embodiment 70 of the calibration target is disclosed wherein the calibration target includes a black target area 72, a white target area 74 and a middle gray target area 76. The middle gray target area 76 is 50% gray, i.e. halfway between the black target area 72 and the white target 74. As is seen in FIGS. 10 and 12, there is a middle target area spike 53 between the black target area spike 52 and the white target area 54. The middle spike 53 represents the gray area and is used to indicate whether the spikes 52 and 54 are shifted left or right.

In FIG. 10 the spikes 52 and 54 are shifted to the left with part of spike 52 being sheared off. This indicates that an under exposed image of the original scene with the subject 12 will occur if the setting obtained from the light meter 22 are used. The exposure settings of the camera 24 are then corrected to shift the spikes 52, 53 and 54 to the right as is shown in FIG.

12. The entire spike 52 is then inside the boundary 56 with the spike remaining inside boundary 58.

While not its primary purpose or design, because the calibration target 40 or 70 contains known values for highlight, mid tone and shadow, it can be useful for back end correction when included in an original scene. While this is a desirable feature, it is primarily a convenience so that a photographer does not have to carry multiple adjustment tools in case a mistake is made and backend corrections are necessary.

Figure 8:
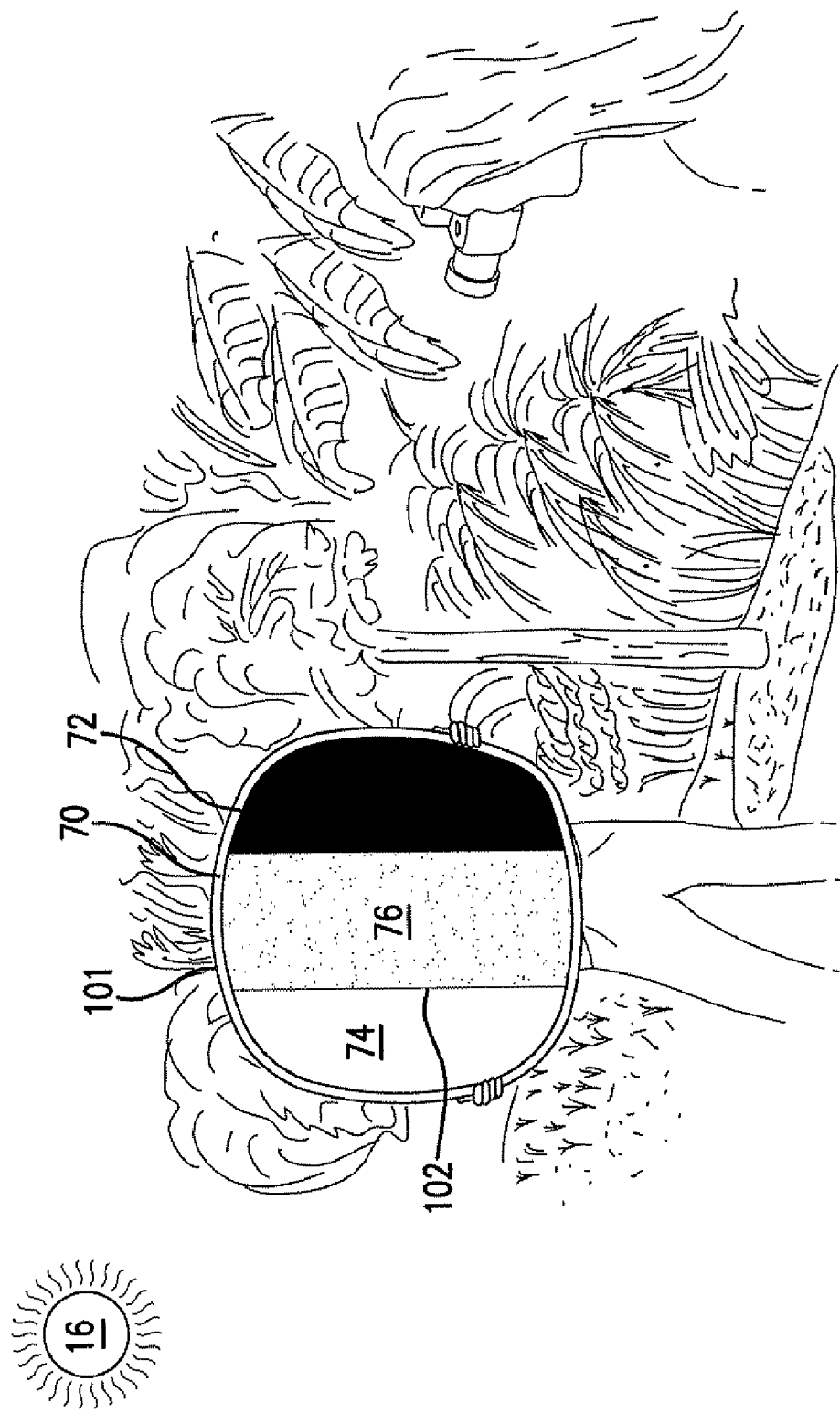
FIG. 8 is a perspective view showing a second embodiment of a calibration target configured in accordance with the present invention.
Figure 9:
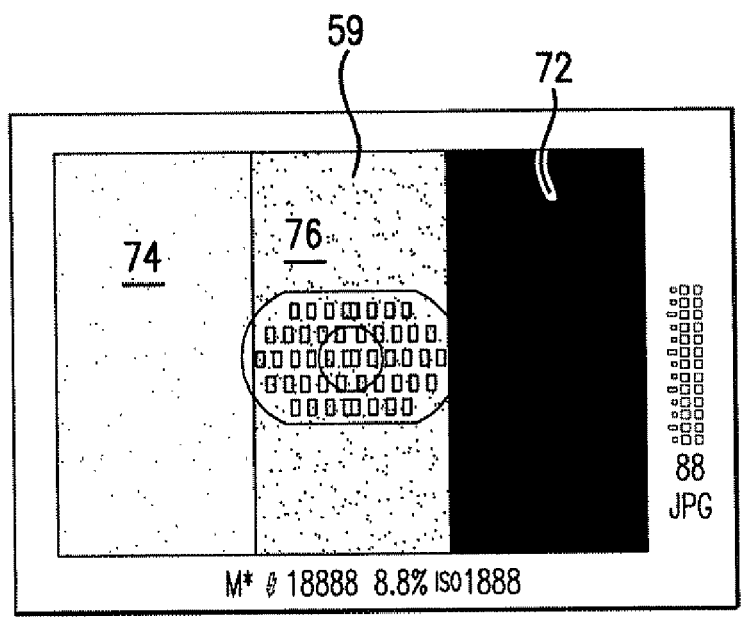
FIG. 9 is an uncorrected image of the second embodiment of the calibration target in the viewfinder of the camera.

A single gray target area 76 is shown in FIG. 8, which is equal in area to the target areas 72 and 74. In accordance with a further embodiment of the invention, there may be two or more gray target areas, each having a tone different from the gray area 76. These additional gray areas will each have an area equal to the black and white target areas 72 and 74, and the single target area 76. By having multiple tones for the gray scale, finer level adjustments may be made on the backend after the image of the original scene has been recorded.

Figure 13:
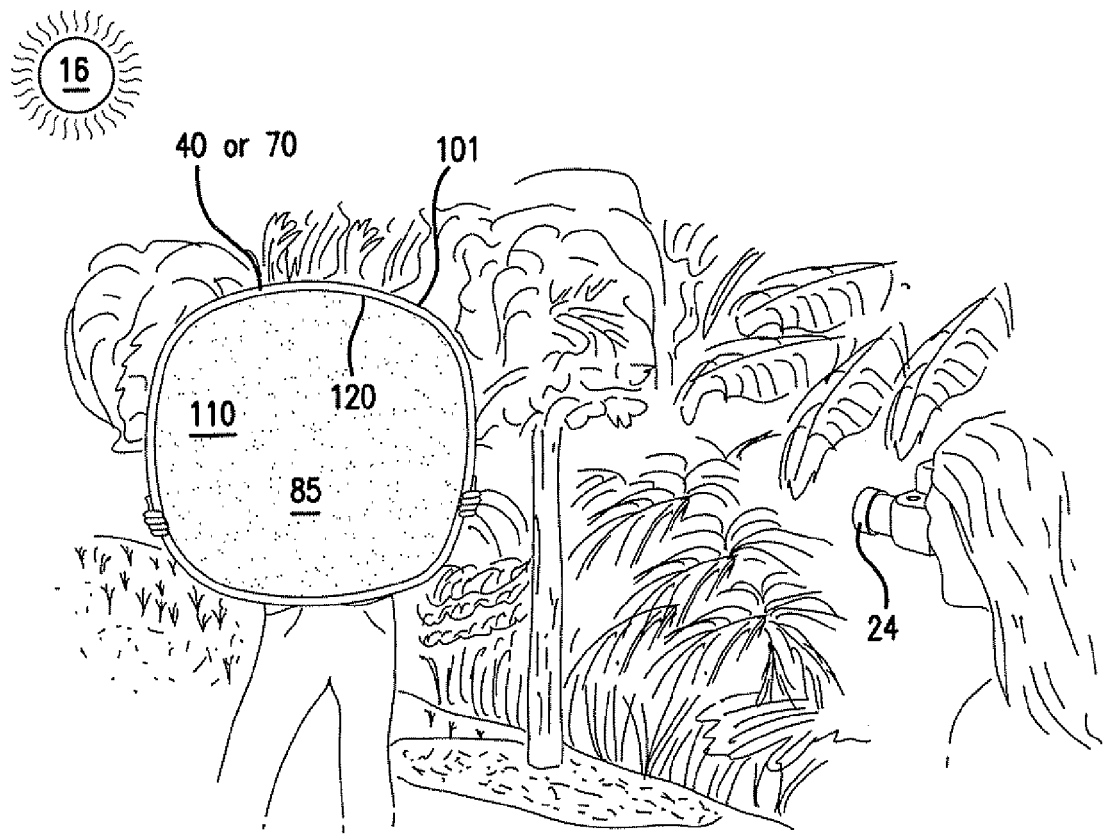
FIG. 13 is a perspective view of a white or gray neutral target for achieving proper white balance at the image scene of FIG. 1.

Referring now to FIG. 13, in conjunction with the calibration target 40 or 70 there is shown a neutral target area 85 that is either white or neutral gray, which neutral target area substantially reflects all wave lengths of light neutrally without color bias. Subsequent to obtaining exposure settings using the calibration target 40 or 70, the neutral calibration target area 85 is focused upon and exposure made by the digital camera 24 in order to achieve white balance for the aforementioned corrected exposure settings. Most cameras 24 provide several options for white balance by providing settings on a menu for daylight, flash, overcast skies, tungsten lighting and fluorescent lighting. These settings are generally not accurate because daylight varies depending on the time of day with the color temperature of daylight being different in the morning, midday and late afternoon. The difference in tungsten depends on how bright the tungsten light bulb really is and what the color temperature will be. All other preset settings also have variances and therefore these other settings cannot be totally accurate either.

Figure 14:
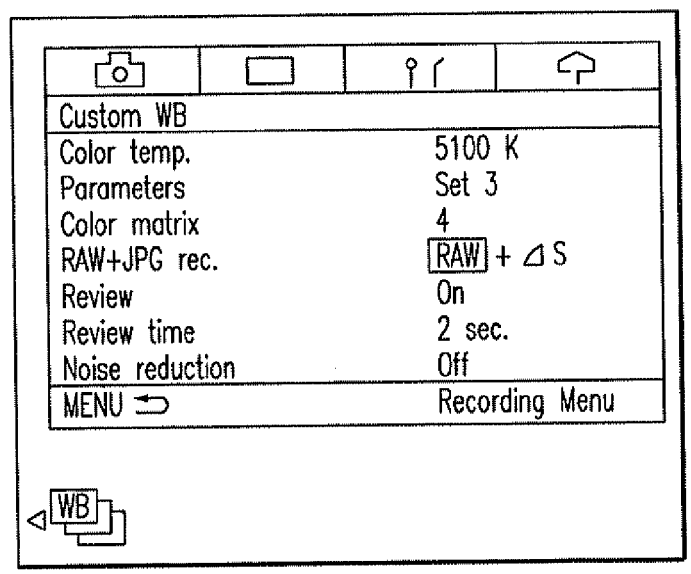
FIG. 14 is a display of custom white balance function determined by exposure to the white or gray neutral target of FIG. 13.
Figure 15:
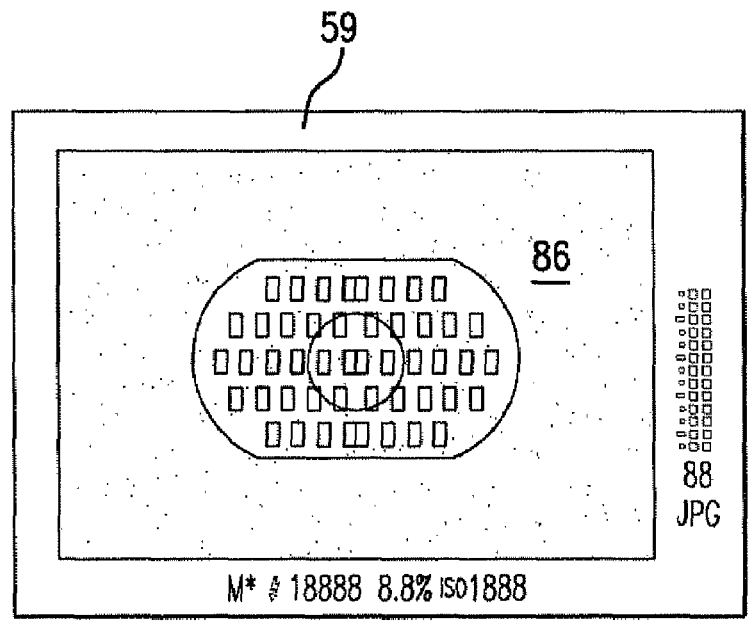
FIG. 15 is a viewfinder image of the white balance target of FIG. 13.
Figure 16:
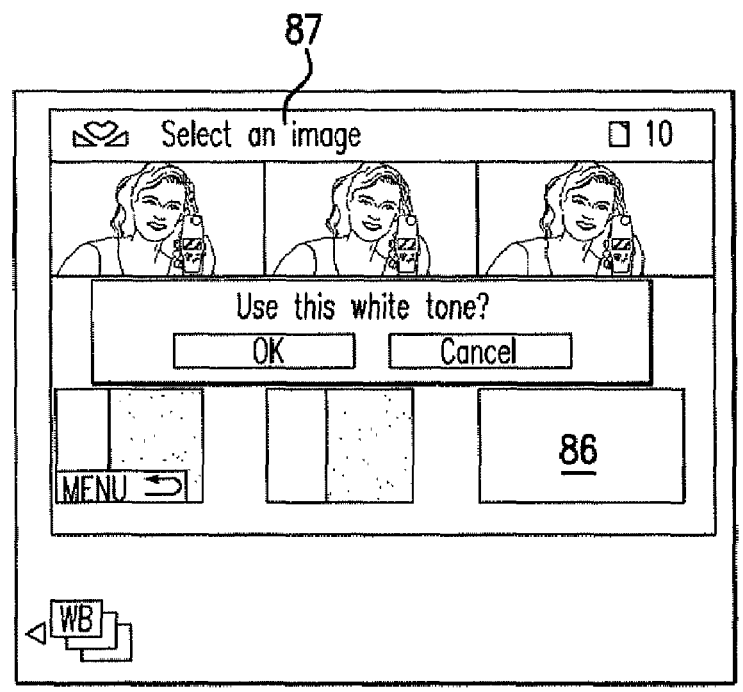
FIG. 16 is a tone selector display of an image taken using the white balance target of FIG. 13 for color balance.

Prior to exposing the image of an original scene 11, the menu on the digital camera 24 is accessed to select a custom white balance function illustrated in FIG. 14 and the set button pressed using as the white point the neutral target area 85. The camera 24 now has a clear white display 86 in the viewfinder 59 of FIG. 15. A tone selector display 87 of FIG. 16 is then used to select from the previously recorded images, images 86 of the neutral calibration target 85. The camera 24 has now been color corrected so that when the subject 12 is photographed, the colors of the image are identical thereto even though the color temperature is different. This allows one to customize the camera 24 so that the camera knows what the white point should be and by setting the white point you get perfect color images from the camera. Alternatively, white balance can be achieved prior to adjusting exposure by relying on handheld meter or the camera meter to achieve a base exposure, and then following the custom white balance procedures as outlined above.

As long as the settings for exposure are correct, as obtained by using the calibration targets 40 and 70 of FIGS. 3 and 8, and as long as the white balance is correctly set, it does not matter what light source 16 is utilized. The photographer will get consistent color, and when the subject 12 is put in front of the camera, the subject will look exactly the same to the camera. Different custom white balances may be stored in the memory of the camera 24 so that each time situations or locations 10 are changed; the appropriate white balance settings can be clipped to the situations so that they can be set up in advance. For example, a wedding photographer might set white balance at the front of the church, white balance for the back of the church and white balance for outside the church. As the photographer moves to each of these locations, the photographer picks a correct custom white balance settings for that location.

Referring now more specifically to FIGS. 8 and 13, the specific calibration target 70 used in practicing the principles of the present invention is in the form of panels 101 having a first side 102 with the black target area 72, the white target area 74 and the gray target area 76 providing an exposure setting calibration target. On a second side 110 of the panel 101 there is the neutral target area 85 which is gray or white providing white balance as described in FIGS. 13-16. The panel 101 is fabricated from four separate pieces of cloth fabric, with the black, white and gray target areas 72, 74 and 76 of the first side 102 being stitched together to form the calibration target for determining exposure settings, and the neutral white or gray target area 85 being fabricated from a single sheet of fabric to form the second side 110 of the panel. The first and second sides 102 and 110 of the panel 101 are stitched to a cloth tube 120, which contains a flat peripheral spring, which has flat sides facing radially.

Figure 17:
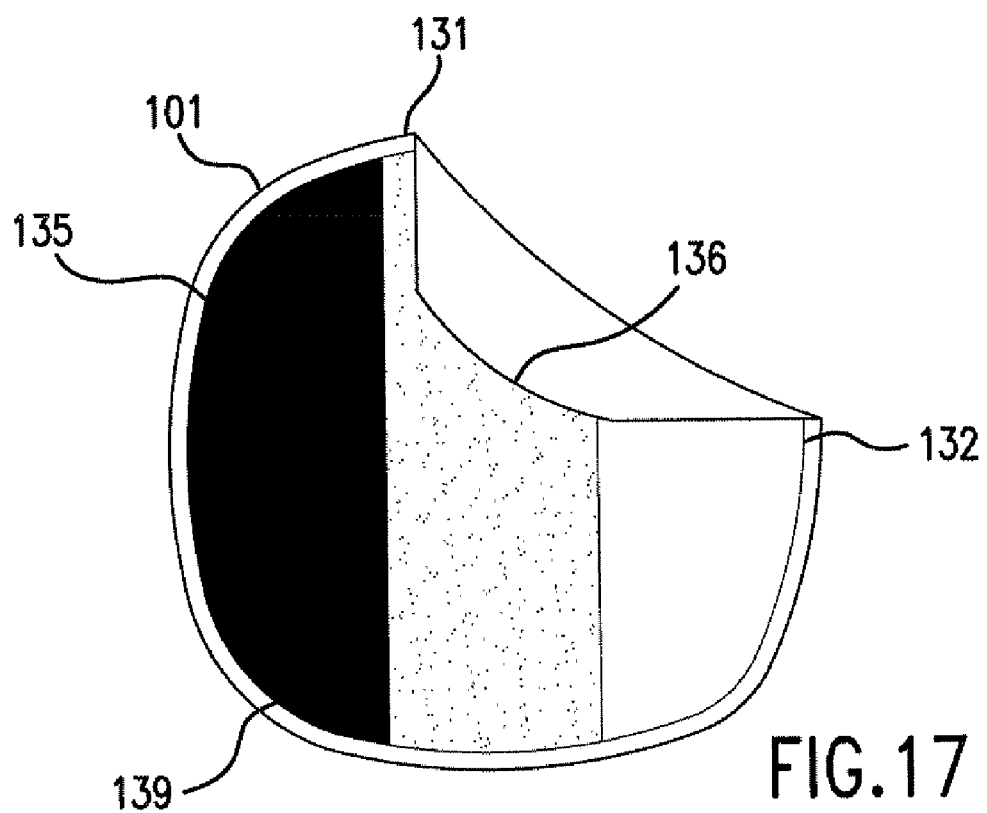
FIG. 17 is a planar view of the calibration target of FIGS. 3, 8 and 13 being folded.
Figure 18:
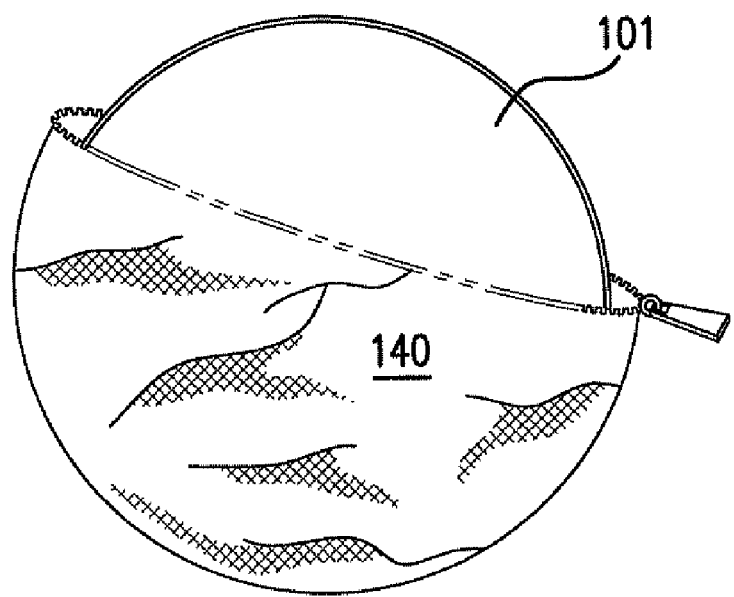
FIG. 18 is a view of the calibration target folded in accordance with FIG. 17 being inserted into a carrying pouch.

As is seen in FIGS. 17 and 18, the panel 101 has relatively straight edges 130-133 joined by curved edge portions 135-139 so that the panel 101 is foldable into overlapping portions. The panel can then be inserted into a zippered pouch 140 for convenient carrying.

The histogram display 50 of FIGS. 5 and 7 and FIGS. 11 and 12 are graphical displays of brightness values, showing important highlight details exemplified by highlight spikes 52 and important shadow details as exemplified by shadow spikes 54. Highlight details are associated with the color white, such as the white areas 44 and 74 on the targets 40 and 70, and shadow details are associated with the color black, such as the black areas 42 and 72 on the targets 40 and 70. The brightness values used to provide images of the spikes 52 and 54 are derived from brightness data obtained by monitoring light entering the camera 24.

In FIGS. 19-22 brightness data is shown by data relating to important highlight detail illustrated by highlight data spike 252 and by data relating to important shadow detail illustrated by shadow data spike 254. The data of spikes 252 and 254 are compared to fixed brightness data regions, i.e., highlight region 256 and shadow region 258, respectively, which correspond to highlight and shadow data that is recordable by the digital camera 25. Data that is too dark or less bright than an acceptable level for a photograph will not appear in the photographed image and data that is too bright will wash out and also will not appear in the digitally photographed image. It is therefore desirable to keep the data forming the highlight spike 252 in the highlight data region 256 and the data forming the shadow data spike 254 in the shadow data region 258 when adjusting exposure settings of the camera 25.

This is accomplished by automating the camera 25 to use exposure control arrangements (already available in the art) but which are according to this invention driven by the histographic data of FIGS. 19-22. This histographic data is preferably the same histographic data that drives the histogram display 50 of FIGS. 5, 7, 10 and 12.

Figure 23:
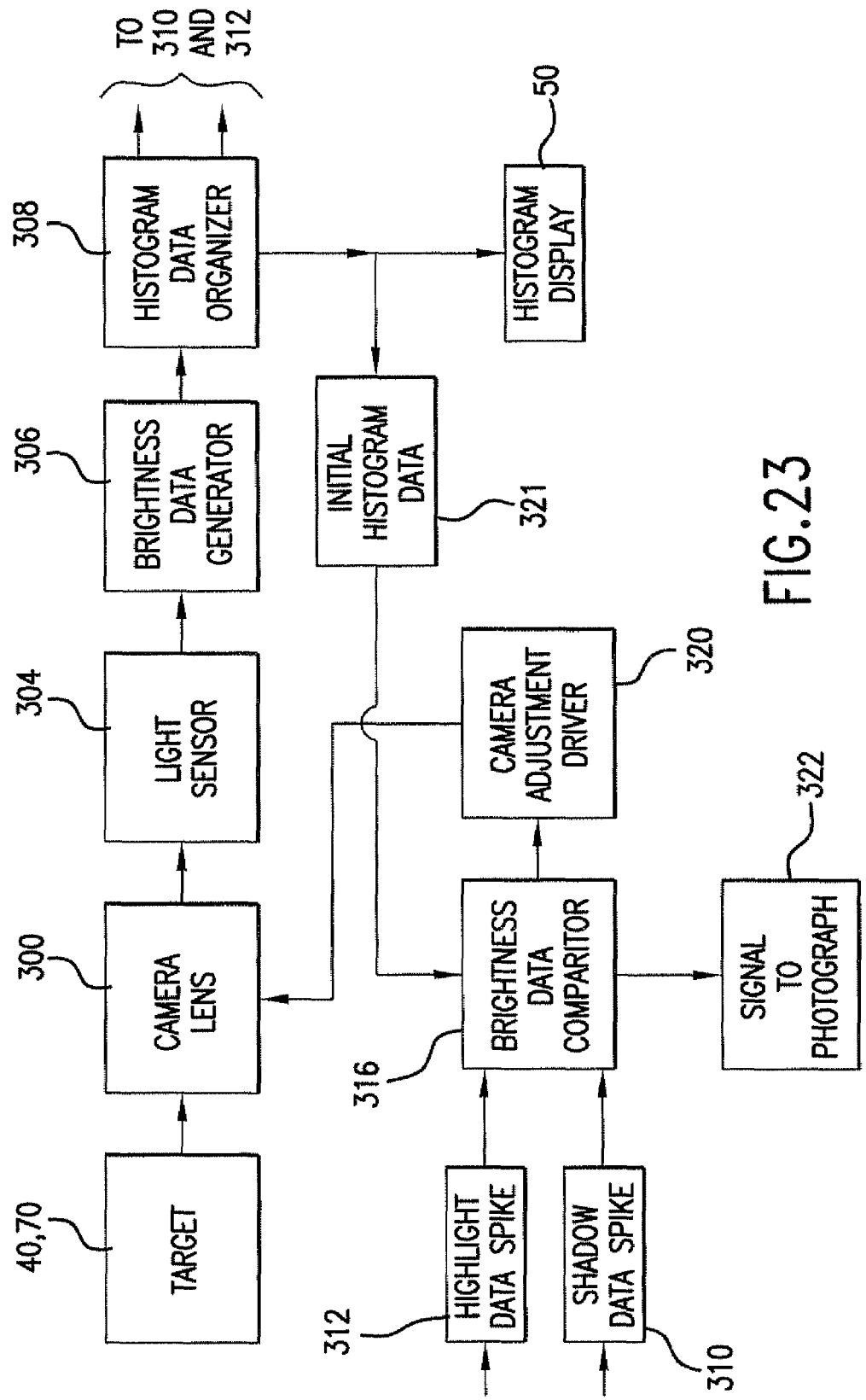
FIG. 23 is block diagram of a circuit for automatically calibrating highlight and shadow detail for a scene to be digitally photographed using a calibration target.

Referring now to FIG. 23, it is seen that a target, which may be the targets 40 or 70 (or in a subsequent embodiment may be portions of a scene, such as the scene 10 of FIG. 1), is viewed through a lens 300 of the camera 24. A light sensor 304 monitors light from the target 40, 70 for brightness and a brightness data generator 306 generates a range of light brightness values that are arranged by a histographic data organizer 308 into a histogram of light brightness data.

This histographic data, which is configured as the spikes may or may not be transmitted to a histogram display, such as display 50 of FIG. 5, 7, 10 or 12. If the target is the target 40, the only histogram data sets are those for black and white, i.e., a shadow data spike 256 and a highlight data spike 254 which are separated for convenience of illustration by boxes 310 and 312, respectively. The shadow and highlight data spikes 252 and 254 are fed to a brightness data comparator 316 which contains the data boundary regions 256 and 258 and initial data 321 from the histogram data organizer 308.

Figure 19:
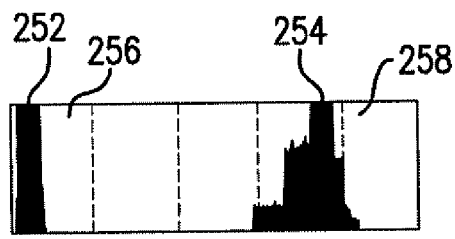
FIG. 19 is a graphical illustration of black and white histographic data obtained from a scene to be digitally photographed shown prior to calibration.
Figure 20:
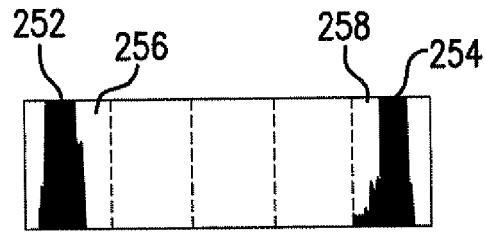
FIG. 20 is an illustration similar to FIG. 19 but shown after brightness calibration.
Figure 21:
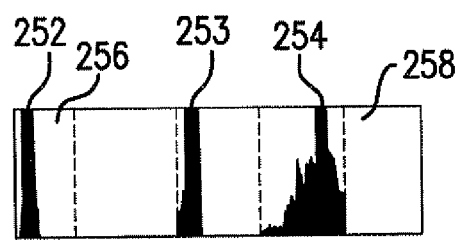
FIG. 21 is an illustration similar to FIG. 19 but including a gray tone.
Figure 22:
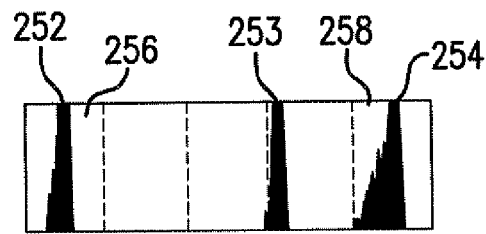
FIG. 22 is an illustration similar to FIG. 20 but including a gray tone.

The initial histogram data 321 of the scene prior to calibration for brightness is shown in FIGS. 19 and 21 (FIG. 21 includes gray target area). In these figures, the highlight data spike 254 is inboard of the boundary region 258. This information is temporarily stored in the brightness data comparator 316. Upon comparing the data of FIG. 20 (or FIG. 22) from the highlight data spikes 310 and 312 to the initial histogram data 321 with the brightness data comparator 216, the brightness data comparator emits a difference signal to at least a lens adjustment driver 320 if the difference is significant. The camera adjustment driver 320 adjusts the aperture, shutter speed or both of the camera 24 until the detected histographic data is organized so that both data spikes are in the boundary regions 252 and 258 as is shown in FIGS. 20 and 22 so that when an image of the scene is recorded, the brightness setting of the camera corresponds to that of the scene.

When and if this match occurs, optionally a signal is sent from the brightness data comparator 316 to a visual or audible indicator 322 indicating to the photographer that brightness detected by the camera 25 is properly calibrated for highlight and shadow.

Figure 24:
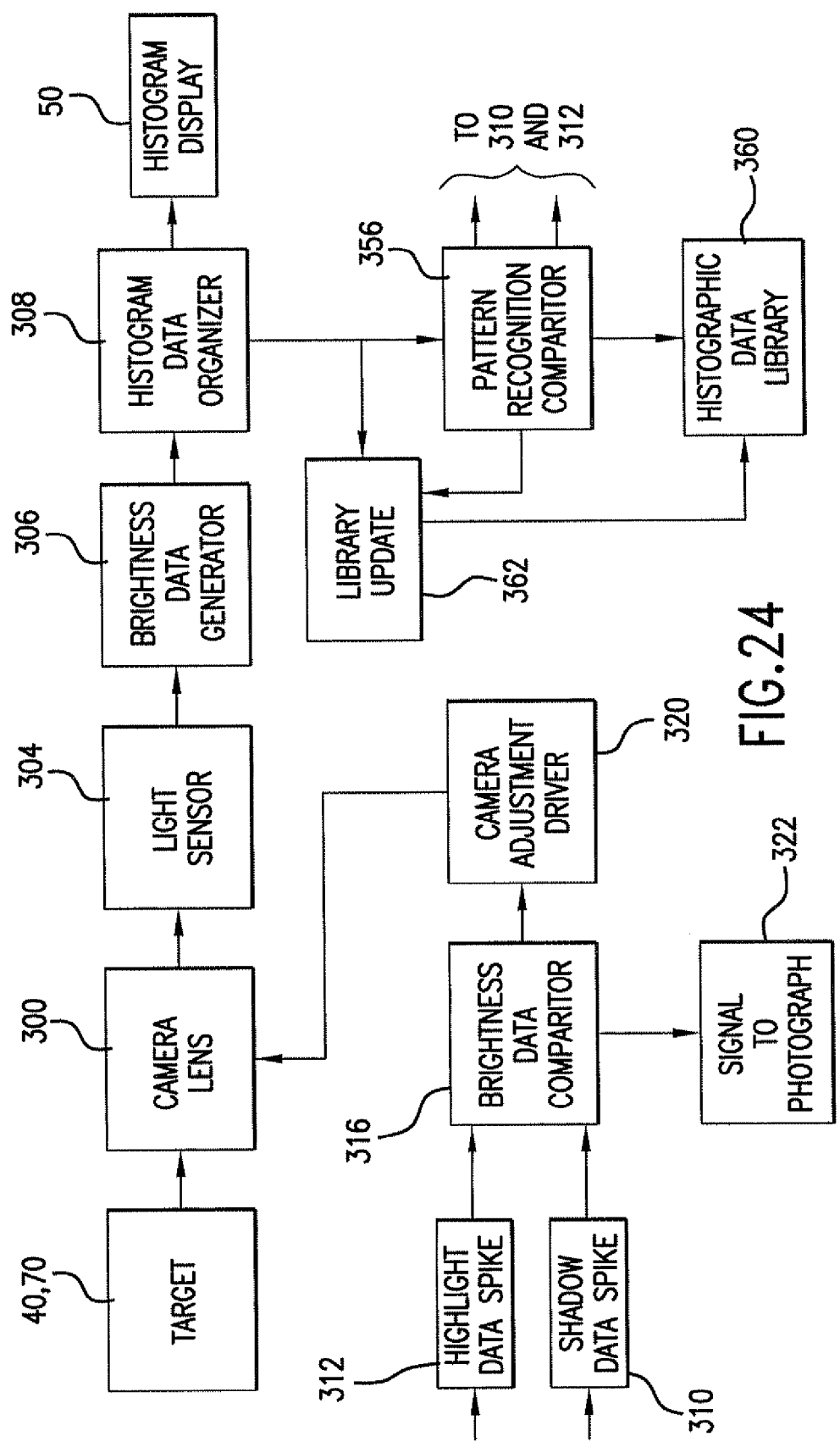
FIG. 24 is a block diagram of an embodiment of a circuit similar to that of FIG. 23, but configured to use histographic data from a scene to digitally calibrate a camera for highlight and shadow detail.

Referring now to FIG. 24, there is shown another embodiment for brightness adjustment using data organized into a histogram, wherein the data utilized for practicing the invention is derived directly from the scene 400 to be, or being photographed. In this embodiment, a similar initial procedure for obtaining brightness data for a histogram of that data is followed as is used for obtaining data for the histogram display 50 of FIGS. 5, 6, 10 and 12. The data of FIG. 24 is initially processed according to the procedure of FIG. 23, however a brightness selector 352 input is provided in FIG. 24 to select portions of the holographic brightness data, which are of interest with respect to the scene being photographed.

In the embodiment of FIG. 24, histogram data in the histogram data organizer 308 is read by a data pattern recognition comparator 356 and matched with data patterns in a library 360 of histographic data sets from standardized images to select the closest data set. Associated with each histographic data set in the library 360 are uncalibrated shadow and highlight data spikes 252 and 254, as shown in FIGS. 19 and 21, and calibrated shadow and highlight histographic data spikes 252 and 254 similar to those of FIGS. 20 and 22. The calibrated data spikes 252 and 254 have associated therewith histographic data in which the data spikes 252 and 254 are located in the data boundaries 256 and 258. The calibrated data spikes 252 and 254 are used to calibrate the camera 24 by adjusting lens aperture or shutter speed, or both, by comparing the calibrated data spikes to the uncalibrated data spikes in a brightness comparator 316 and applying the difference to the camera adjustment driver 320 which is connected to the camera lens controller 300. Each time a new photograph is taken, there is the option of recording the histographic data thereof in the library 360 by using a library update 262 having an input of original histographic data from the organizer 308 and an input of shadow and highlight initial and calibrated data spikes 252 and 254 from the patter recognition comparator 356.

The pattern recognition comparator 356 has outputs 310 and 312 for the data spikes.

From the foregoing description, one skilled in the art can easily ascertain the essential characteristics of this invention, and without departing from the spirit and scope thereof, can make various changes and modifications of the invention to adapt it to various usages and conditions.

I claim:

1. An arrangement for calibrating a digital camera so that a digital derived image of a scene being photographed has the same highlights and shadows as the scene, the arrangement comprising:
   a target image having light and shadow areas;
   within the camera, a generator of brightness data and a histographic data organizer for organizing the brightness data into histographic data, the histographic data organizer having an initial brightness output of uncalibrated shadow and highlight data spikes, wherein the data spikes are not necessarily located at brightness boundaries of the camera, the data organizer further having calibrated data output with the shadow and highlight data spikes located at the brightness boundaries;
   a brightness data comparator within the camera and connected to the histogram data organizer for comparing the calibrated highlight and shadow data spikes to the initial highlight and shadow data spikes to generate a difference signal, and
   a camera adjustment driver connected between the brightness data comparator and a camera lens control for adjusting settings of lens aperture or lens shutter speed or both aperture and shutter speed until the difference signal indicates substantial correspondence between the initial histogram data boundary and the calibrated histogram data boundary to thereby set the histogram to the calibrated setting, whereby the image being photographed has at least substantially the same highlights and shadows as the scene being photographed.

2. The arrangement of claim 1, wherein the target image consists of a black area and a white area.

3. The arrangement of claim 1, wherein the target image consists of a black area, a white area and a gray area.

4. The arrangement of claim 1, wherein the target image is derived from the scene being photographed.

5. A method of calibrating a digital camera so that an image of a scene being digitally photographed has at least substantially the same highlights and shadows as the scene itself, the method comprising:
   photographing a target image having highlight and shadow areas;
   generating from the photograph of the target image a highlight data spike and an initial shadow data spike, the initial data spikes being positioned at initial positions with respect to highlight and shadow data boundaries;
   generating a calibrated highlight data spike and a calibrated shadow data spike, the calibrated data spikes being positioned in the highlight and shadow data boundaries,
   comparing the positions of the initial data spike to that of the calibrated data spikes with respect to the highlight and shadow data boundaries;
   if the positions are different, generating a difference signal, and
   using the difference signal to adjust lens aperture or shutter speed or both lens aperture and shutter speed so that there is substantial correspondence between the initial histogram data boundaries and the calibrated histogram data boundaries, whereby the digitally photographed image has at least substantially the same highlights and shadows as the scene itself.

6. The method of claim 5, wherein the target image consists of a black area and a white area.

7. The method of claim 5, wherein the target image consists of a black area, a white area and a gray area.

8. The method of claim 5, wherein the target image is derived from the scene being photographed.

* * * * *